(12) United States Patent
Nurmi

(10) Patent No.: US 8,310,459 B2
(45) Date of Patent: Nov. 13, 2012

(54) TOUCH DETECTION

(75) Inventor: Juha H-P Nurmi, Salo (FI)

(73) Assignee: Nokia Corporation, Espoo (FI)

( * ) Notice: Subject to any disclaimer, the term of this patent is extended or adjusted under 35 U.S.C. 154(b) by 534 days.

(21) Appl. No.: 12/565,472

(22) Filed: Sep. 23, 2009

(65) Prior Publication Data

US 2011/0069015 A1    Mar. 24, 2011

(51) Int. Cl.
*G06F 3/041* (2006.01)
*G09G 5/00* (2006.01)
(52) U.S. Cl. ............................. 345/173; 345/1.1; 345/4
(58) Field of Classification Search ........................ None
See application file for complete search history.

(56) References Cited

U.S. PATENT DOCUMENTS

| | | | |
|---|---|---|---|
| 7,081,886 B2 | 7/2006 | Nakano et al. | |
| 7,436,395 B2 | 10/2008 | Chiu et al. | |
| 7,848,825 B2 * | 12/2010 | Wilson et al. | 700/3 |
| 8,022,940 B2 * | 9/2011 | Hung et al. | 345/173 |
| 2006/0221021 A1 | 10/2006 | Hajjar et al. | |
| 2008/0158177 A1 | 7/2008 | Wilson et al. | |
| 2008/0162997 A1 * | 7/2008 | Vu et al. | 714/27 |
| 2009/0189867 A1 * | 7/2009 | Krah et al. | 345/173 |
| 2009/0250269 A1 | 10/2009 | Hung et al. | |
| 2010/0283760 A1 | 11/2010 | Leung et al. | |

FOREIGN PATENT DOCUMENTS

| | | |
|---|---|---|
| CN | 101398734 | 4/2009 |
| CN | 101694551 | 4/2010 |
| JP | 5341251 | 12/1993 |
| KR | 2000/0067673 | 11/2000 |
| WO | WO 2009/032304 | 3/2009 |

OTHER PUBLICATIONS

PCT International Search Report for corresponding International Application No. PCT/FI2010/050625.

* cited by examiner

*Primary Examiner* — K. Wong
(74) *Attorney, Agent, or Firm* — Locke Lord LLP

(57) ABSTRACT

An apparatus with a first and second touch screen, where the first touch screen has a plurality of first touch sensors formed as a first grid of rows and columns and the second touch screen has a plurality of second touch sensors formed as a second grid of rows and columns. A first processor detects touch areas by scanning through the first touch sensors in a predetermined order along the rows and columns. A second processor detects touch areas by scanning through the second touch sensors in a predetermined order along the rows and columns. A controller causes that the first and second processors scan the first and second grids synchronized such that when the first and second touch screens are arranged side by side, neighboring first and second touch sensors are scanned substantially simultaneously.

20 Claims, 3 Drawing Sheets

TOUCH DETECTION

TECHNICAL FIELD

The present invention generally relates to touch detection. The invention relates particularly, though not exclusively, to detecting touch on a surface that comprises more than one touch detection screen.

BACKGROUND ART

Touch screens have become common in modern mobile phone user interfaces. A touch screen typically comprises a surface with a matrix of touch sensitive nodes and a processor connected to scan through the matrix to detect the state of each node. There are various types of touch screens, such as resistive, capacitive, optical and pressure sensitive touch screens. The physical operation of the nodes depends on the type of the touch screen, but in common the nodes electrically indicate touch of a finger or stylus to the processor at the node in question and the processor deduces from the states of the nodes the area or areas being touched in a particular detection frame. The detected areas of a detection frame are provided by the processor to a host device for processing as user input.

SUMMARY

According to a first example aspect of the invention there is provided an apparatus comprising:
  a first touch screen comprising a plurality of first touch sensors formed as a first grid of rows and columns;
  a second touch screen comprising a plurality of second touch sensors formed as a second grid of rows and columns;
  a first processor configured to detect touch areas by scanning through the first touch sensors in a predetermined order along the rows and columns;
  a second processor configured to detect touch areas by scanning through the second touch sensors in a predetermined order along the rows and columns; and
  a controller configured to cause the first and second processors to scan the first and second grids synchronized such that when the first and second touch screens are arranged side by side, neighboring first and second touch sensors are scanned substantially simultaneously.

The first processor may comprise the controller.

According to a second example aspect of the invention there is provided a method in an apparatus comprising a first touch screen comprising a plurality of first touch sensors formed as a first grid of rows and columns; and a second touch screen comprising a plurality of second touch sensors formed as a second grid of rows and columns; the method comprising:
  detecting touch areas by scanning through the first touch sensors in a predetermined order along the rows and columns;
  detecting touch areas by scanning through the second touch sensors in a predetermined order along the rows and columns; and
  causing that the first and second processors scan the first and second grids synchronized such that when the first and second touch screens are arranged side by side, neighboring first and second touch sensors are scanned substantially simultaneously.

According to a third example aspect of the invention there is provided a computer program comprising computer executable program code configured, when executed by the computer, to control an apparatus comprising a first touch screen comprising a plurality of first touch sensors formed as a first grid of rows and columns; and a second touch screen comprising a plurality of second touch sensors formed as a second grid of rows and columns; the controlling comprising causing the apparatus to:
  detect touch areas by scanning through the first touch sensors in a predetermined order along the rows and columns;
  detect touch areas by scanning through the second touch sensors in a predetermined order along the rows and columns; and
  cause the first and second processors to scan the first and second grids synchronized such that when the first and second touch screens are arranged side by side, neighboring first and second touch sensors are scanned substantially simultaneously.

According to a fourth example aspect of the invention there is provided a memory medium carrying the computer program of the third aspect.

The memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1A:
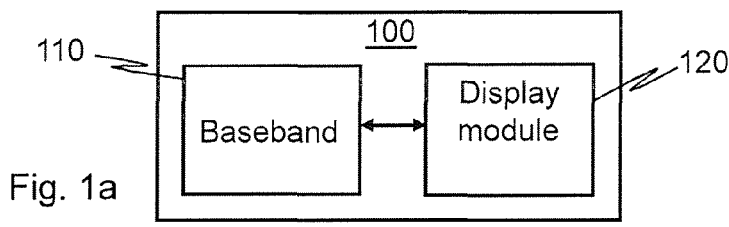
FIG. 1a shows a schematic drawing of an apparatus according to a first example aspect of the invention.

FIG. 1a shows a schematic drawing of an apparatus 100 according to a first example aspect of the invention. The apparatus 100 may be, for instance, a handheld device with a touch screen, such as a mobile phone, internet browser, electronic book, navigator, personal digital assistant, game device, or multifunction device with more than one of these functionalities.

The apparatus 100 comprises two major parts for explaining the operation of the apparatus 100: a baseband part 110 and a display module 120.

Figure 1B:
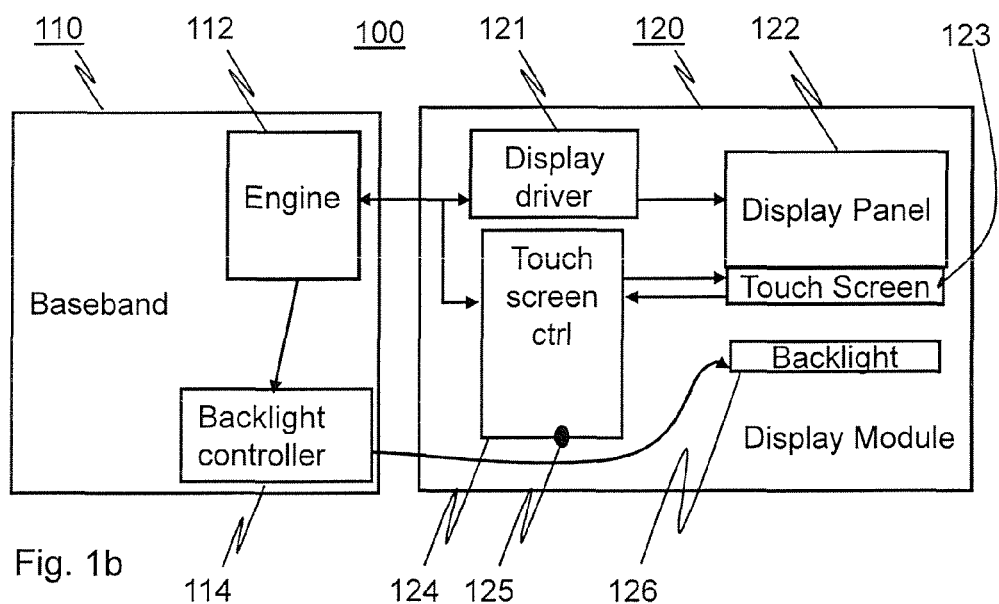
FIG. 1b shows a schematic drawing of the apparatus of FIG. 1a with further details.

FIG. 1b shows a schematic drawing of the apparatus of FIG. 1a with further details. FIG. 1b shows that the baseband part comprises an engine 112 that is explained with further detail in conjunction with FIG. 2, and a backlight controller 114. The display module 120 comprises a display driver 121 and a display panel 122 under control of the display driver. The display panel is, for example, a liquid crystal, plasma, or organic light emitting diode (OLED) based display panel. The display module 120 further comprises a touch screen 123 and a touch screen controller 124 for controlling the touch screen 123 and for obtaining touch information from the touch screen 123. The touch screen 123 is, for example, a resistive, capacitive, optical or pressure sensitive touch screen, or any combination of these.

The touch screen controller 124 further comprises an interworking port 125. Moreover, the display module comprises a backlight 126 for the display panel 122.

The engine 112 is connected with the display driver 121 and touch screen controller 124 such that the engine can feed desired content for display and receive touch information from the touch screen 123. Moreover, the engine is connected to the backlight controller so as to steer the backlight 126 with the backlight controller 114.

Figure 5:
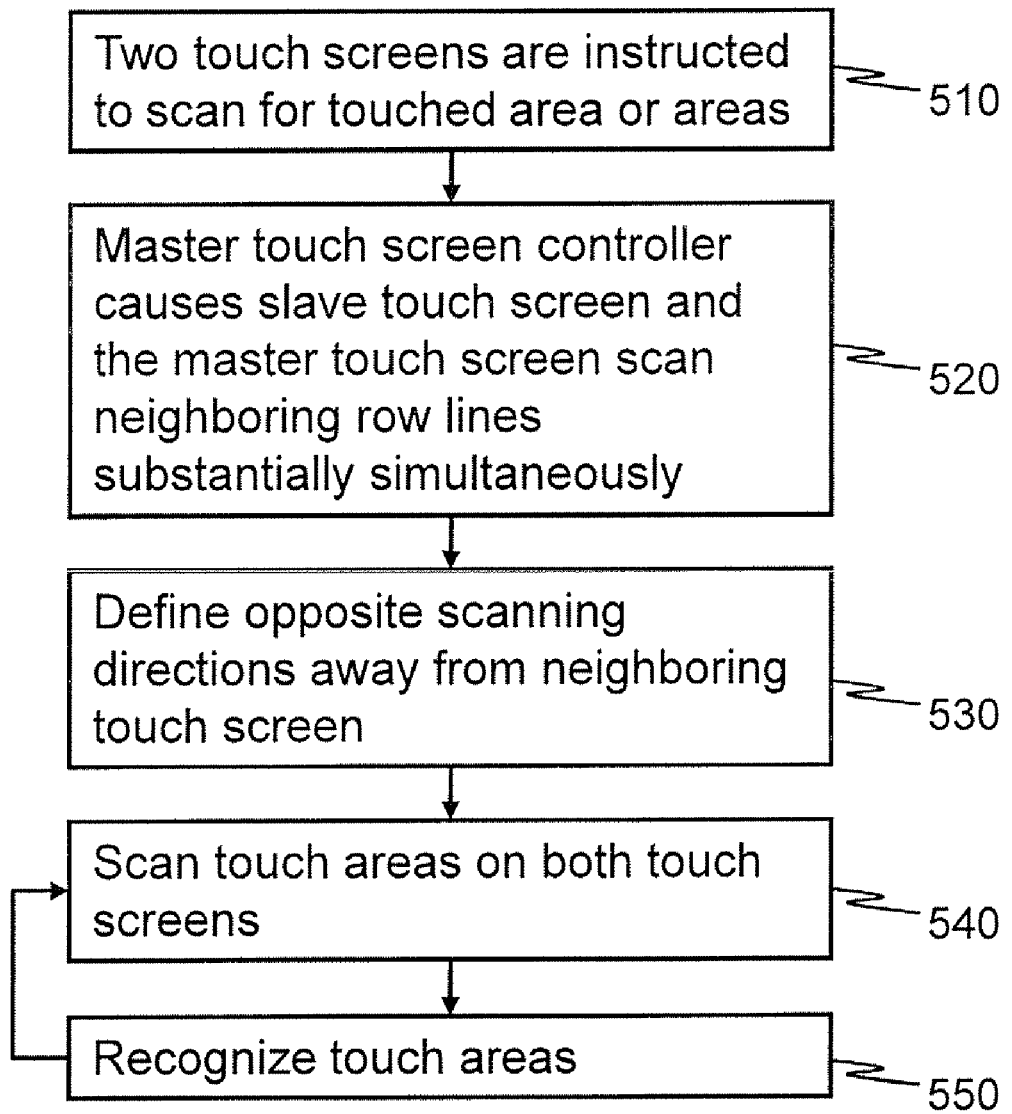
FIG. 5 shows a schematic flow chart of a process according to a fourth example aspect of the invention.

The implementation of the various functional blocks shown in FIG. 1b is known except that the touch screen controller 124 is provided with an interworking port 125 that is configured to output or input interworking information. This interworking is disclosed further in connection with FIG. 5. It helps understanding that description to describe some further structures and operation according to some embodiments of the invention.

Figure 2:
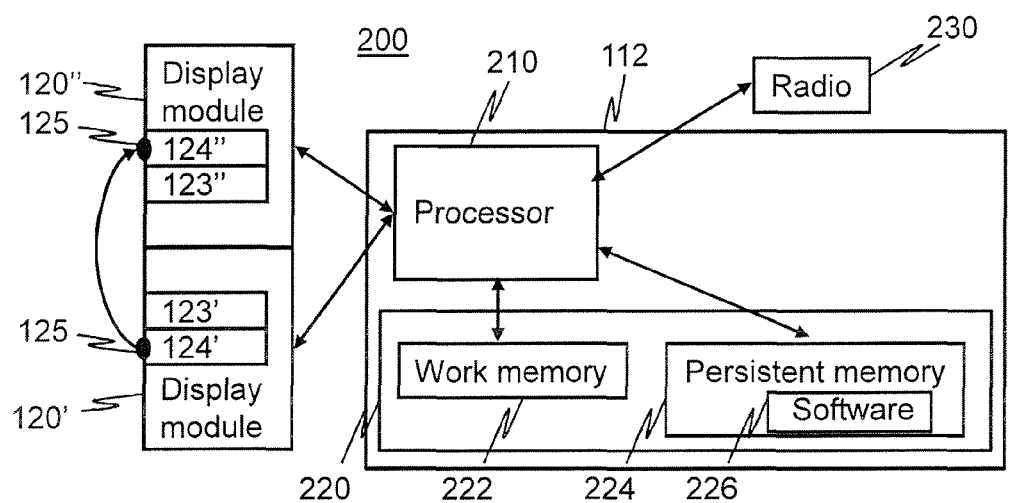
FIG. 2 shows a schematic drawing of an apparatus according to a second example aspect of the invention.

FIG. 2 shows a schematic drawing of an apparatus 200 according to a second example aspect of the invention. The apparatus 200 comprises the engine 112 of FIG. 1b, here drawn as an assembly of a processor 210, memory 220 comprising a work memory 222 and persistent memory 224 with software 226. Thus, the engine 112 in this example embodiment is software or firmware based engine. The processor 210 is, for instance, a microprocessor with one or more cores, a digital signal processor, an application specific integrated circuit (ASIC), a field programmable gate array, a microcontroller or a combination of such elements. The processor 210 is configured to execute computer executable program code of the software 226 in the work memory 222 and according to the program code, the processor is configured to control different functionally connected devices. In FIG. 2, the processor 210 is functionally connected to a communication unit 230 that in this example embodiment is a radio communication unit, and to a pair of adjacent or adjacently configurable display modules. The display modules are denoted as a first display module 120' and a second display module 120". The first display module 120' is configured to operate as a master and configured to control the second display module 120" with interworking information provided via interworking ports 125 of the first and second display modules 120' and 120".

In FIG. 2, the two different display modules are denoted with reference signs 120' and 120" indicative of that their structure may be otherwise identical with the display module 120 of FIG. 1b, except that in one of the display modules, the touch screen controller 124' is configured as a master and in another display module, the touch screen controller 124" is configured as a slave. In some embodiments, though, the display modules differ by structure. For instance, the touch screens in the different display modules may be of different types. The two touch screen controllers are communicatively connected such that the master touch screen controller 124' feeds interworking information to the slave touch screen controller 124" via the interworking ports 125.

Figure 3:
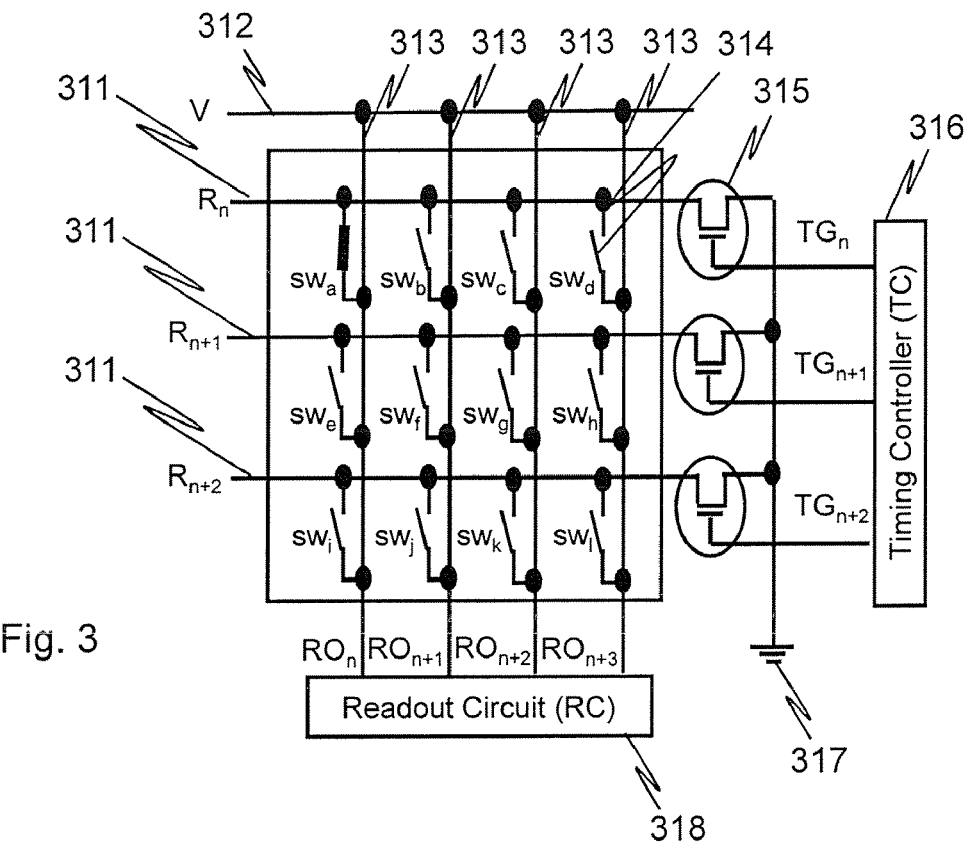
FIG. 3 shows a schematic drawing of a switch grid for illustrating a first example implementation of a touch screen for an apparatus of FIGS. 1a and 1b.

FIG. 3 shows a schematic drawing of a switch grid for illustrating a first example implementation of the touch screen 123 for an apparatus of FIG. 1b. Generally, a touch screen comprises touch sensors which in this example are exemplified by switches that react to touching the touch screen 123. It is appreciated, though, that in some example embodiments of the invention, the touch screen 123 is configured to form a virtual grid or logical grid i.e. the touch screen need not be physically divided into rows and columns as will be described in the following. Due to the grid form, the touch screen 123 can also be referred to as a matrix touch screen. In FIG. 3, there is a grid of switches 314. By pressing the touch screen at given point or area, the effected switches will close and connect respective signal lines that are in row lines 311 and read-out lines 313 (as columns in FIG. 3). While in FIG. 3 the row lines and read-out lines are orderly laid in a matrix form, it is appreciated that there are other example embodiments in which the rows and columns are not in 90 degree angle and/or the rows and/or columns conform to non-linear form (e.g. zigzag or conform to a meandering line). Generally, it suffices that subsequent processing is aware of the location of each touch sensor with regard to associated display if the touch screen is to be used as a pointing device for the display. The read-out lines are each fed with a voltage V from voltage supply line 312. The row lines 311 are grounded one by one with respective gate circuits 315 e.g. transistors $TG_n$ to $TG_{n+2}$ under control of a timing controller 316. The timing controller 316 is configured to cause each of the gate circuits 315 in turn to ground 317 each of the row lines 311. A read-out circuit 318 has respective inputs for each read-out line 313. When a given part of the touch screen is touched, the respective switches 314 draw current to ground from the read-out line in question. Based on the alternating grounding of the row lines 311, the read-out circuit determines the row on which a particular switch is being actuated to connect the read-out line to ground. Such grounding by a switch may further involve applying resistance such that the grounding does not cause excess current. However, even in that case, the voltage at a particular read-out line of the read-out circuit input decreases in a manner that enables the read-out circuit to detect contact at that particular read-out line. The crossing between the detected grounded read-out line and the grounded row-line thus matches with the switch that is being actuated.

In effect, the voltage at a read-out line is thus high when each switch on that read-out line is open. Correspondingly, the voltage is low when a switch at a grounded row line is closed.

Every row line 311 is grounded once during one touch scanning period. The touch scanning period is, for instance, 1 s per 20 to 100, e.g. 1/60 s.

The touch screen of FIG. 1b resides aligned with (e.g. underneath or on top of) a display such that a user may touch on a given part of displayed image and the corresponding part of image can be determined. Each switch of the touch screen may correspond to one or more pixels (e.g. to areas of two times two pixels or four times four pixels of the display).

However, it is appreciated that in another aspect, touch screens are used without a display aligned with the touch screen.

The timing controller 316 is, in turn, controlled by the touch screen controller 124. In an alternative embodiment, the timing controller 316 is a part of the touch screen controller 124.

In the example shown in FIG. 2, one touch screen controller was used to control another touch screen controller by means of interworking information that indicates timing for a slave touch screen controller. In an alternative embodiment, the timing controller 316 of the master touch screen is connected to the row lines of two touch screens 123 such that the neighboring row lines are connected to a first gate circuit 315 and each subsequent row line of each touch screen 123 is connected to a subsequent gate circuit 315. In this embodiment, suitable connectors are provided between the two touch screens 123 either as analog circuitry in which there is a separate connection line for each gate circuit 315 or as digital circuitry in which one or more signal line is multiplexed to indicate plurality of different row lines.

Figure 4:
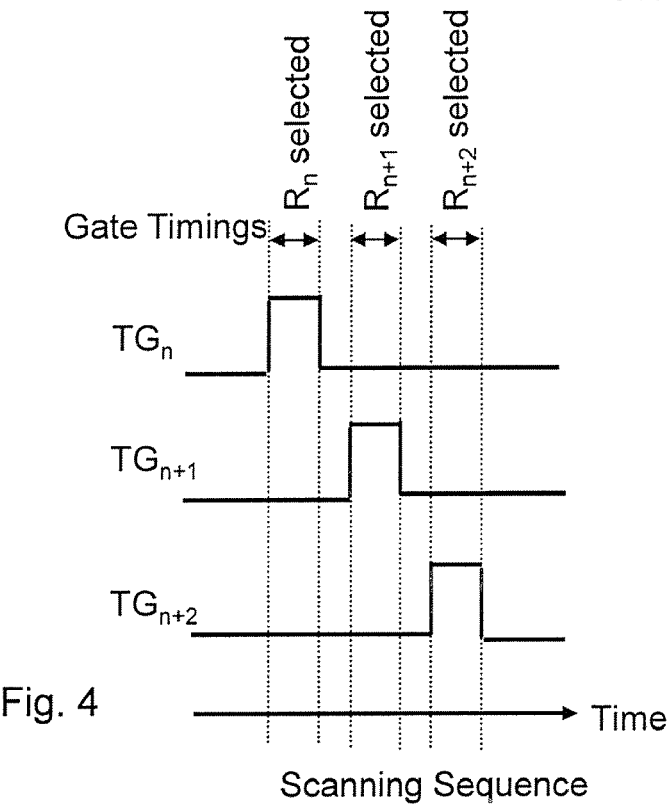
FIG. 4 shows a timing chart illustrative of gate timing for FIG. 3.

FIG. 4 shows a timing chart illustrative of gate timing for FIG. 3. The timing chart visualizes how successive row lines are scanned (for each read-out line) at sub-sequent periods of time such that contacts at a further read-out line are detected at a later moment of time.

It is now explained how the touch screen is scanned line by line to detect touch. Let us next resume to consider operation in the apparatus of FIG. 2 with reference to FIG. 5 that shows a schematic flow chart of a process according to a fourth example aspect of the invention.

Two touch screens 123 reside side by side so that they each have grids (as illustrated in FIG. 4) and at neighboring sides of the grids, there are neighboring row lines 311 of each touch screen 123 adjacent to each other. The engine 112 then instructs 510 the touch screens 123 to scan for touched area or areas on the touch screens 123. The master touch screen controller 124' provides 520 the slave touch screen controller 124" with interworking information via the interworking ports 125 such that the slave touch screen 123" and the master touch screen 123' scan the neighboring row lines 311 in a synchronized manner. That is, the neighboring lines are scanned substantially simultaneously and with substantially common intervals. Moreover, in an example embodiment of the invention, the master touch screen 123' and the slave touch screen 123" scan the row lines in an order in which the scanning proceeds outwards of the neighboring row lines. The master touch screen controller 124' may also control 530 the scanning direction of the slave touch screen 123". This controlling by the master touch screen controller 124' may take place by instructing the scanning direction in the interworking information. Each of the two touch screens 123 is repeatedly scanned 540, row by row, and touch areas are recognized 550 by the engine 112.

By scanning substantially simultaneously the neighboring row lines 311, it is quicker and more robust to detect a simultaneous touch that spans onto two different matrix touch screens than if the two touch screens were scanned at the neighboring lines at different, random moments of time. The substantially simultaneous scanning may also avoid or mitigate detecting as two separate contacts a touch that bridges edges of two adjacent touch screens.

It is appreciated that in some embodiments of the invention, the two touch screens 123 have different number of rows in the grid. In such a case, there are various ways to maintain substantially simultaneous scanning of the neighboring row lines 311. First, the number of row lines in one touch screen may be a multiple of the number of row lines in the other touch screen. Then, the touch screen with fewer row lines can be scanned a number of times per one scanning of the other touch screen. Second, both touch screens can be scanned so that all the row lines are scanned within common scanning period. The interval between subsequent row lines then varies between the two touch screens. Third, the touch screens can be scanned at their own rates such that the touch screen that is first entirely scanned waits until the other touch screen scanning resumes at the neighboring row line.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

For example, in connection with FIG. 2, it was disclosed how one touch screen controller 124 may function as a master that controls the operation of another touch screen controller. In another example embodiment of the invention, a controlling component controls two different touch screens such that their operation takes place in a synchronized manner so that each touch screen scans the neighboring row lines substantially simultaneously. The controlling component is, for instance, a common component also used for some other purpose or a dedicated component. The engine 112 can be used as an example of suitable common component. In either case of using a common or dedicated component, the controlling component may provide controlled touch screens with timing information and optionally also with direction information that determines the order (direction) in which controlled. The controlling component may provide both touch screens with timing. Alternatively, the controlling component may comprise an input configured to receive a timing related signal from a first touch screen and a processor configured to control the timing of a neighboring second touch screen according to the timing of the first touch screen.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

I claim:
1. An apparatus comprising:
   a first touch screen comprising a plurality of first touch sensors formed as a first grid of rows and columns;
   a second touch screen comprising a plurality of second touch sensors formed as a second grid of rows and columns;
   a first processor configured to detect touch areas by scanning through the first touch sensors in a predetermined order along the rows and columns;
   a second processor configured to detect touch areas by scanning through the second touch sensors in a predetermined order along the rows and columns; and
   a controller configured to cause the first and second processors to scan the first and second grids synchronized such that when the first and second touch screens are arranged side by side so that at neighboring sides of the first and second grids there are neighboring rows of each touch screen adjacent to each other, the first and second touch sensors of neighboring rows are scanned substantially simultaneously.

2. An apparatus according to claim 1, wherein the first processor comprises the controller.

3. An apparatus according to claim 1, wherein the apparatus further comprises a third processor and the third processor comprises the controller.

4. An apparatus according to claim 3, wherein the third processor is configured to function as a baseband frequency signal processing engine.

5. An apparatus according to claim 1, wherein the apparatus further comprises a first display and a second display, wherein the first touch screen and the first display are stacked and wherein the second touch screen and second display are stacked.

6. An apparatus according to claim 1, the apparatus further comprising a first timing controller configured to select for touch detection one row at the time in the first grid of rows and columns.

7. An apparatus according to claim 6, the apparatus further comprising a second timing controller configured to select for touch detection one row at the time in the first grid of rows and columns.

8. An apparatus according to claim 6, wherein the first timing controller is further configured to select for touch detection one row at the time in the second grid of rows and columns.

9. An apparatus according to claim 1, wherein the apparatus further comprises a first read-out circuit configured to detect columns in the first grid indicative of touch at a crossing with a currently selected row of the first grid.

10. An apparatus according to claim 9, wherein the apparatus further comprises a second read-out circuit configured to detect columns in the second grid indicative of touch at a crossing with a currently selected row of the second grid.

11. A method in an apparatus comprising a first touch screen comprising a plurality of first touch sensors formed as a first grid of rows and columns; and a second touch screen comprising a plurality of second touch sensors formed as a second grid of rows and columns; the method comprising:
    detecting touch areas by scanning through the first touch sensors in a predetermined order along the rows and columns;
    detecting touch areas by scanning through the second touch sensors in a predetermined order along the rows and columns; and
    causing first and second processors to scan the first and second grids synchronized such that when the first and second touch screens are arranged side by side so that at neighboring sides of the first and second grids there are neighboring rows of each touch screen adjacent to each other, the first and second touch sensors of neighboring rows are scanned substantially simultaneously.

12. A method according to claim 11, further comprising selecting by a first timing controller for touch detection one row at the time in the first grid of rows and columns.

13. A method according to claim 12, further comprising selecting by a second timing controller for touch detection one row at the time in the first grid of rows and columns.

14. A method according to claim 12, further comprising selecting by the first timing controller for touch detection one row at the time in the second grid of rows and columns.

15. A method according to claim 11, further comprising detecting by a first read-out circuit columns in the first grid indicative of touch at a crossing with a currently selected row of the first grid.

16. A method according to claim 15, further comprising detecting by a second read-out circuit columns in the second grid indicative of touch at a crossing with a currently selected row of the second grid.

17. An article of manufacture comprising a computer readable medium containing computer executable program code configured, when executed by a computer, to control an apparatus comprising a first touch screen with a plurality of first touch sensors formed as a first grid of rows and columns and a second touch screen with a plurality of second touch sensors formed as a second grid of rows and columns; the controlling comprising causing the apparatus to:
    detect touch areas by scanning through the first touch sensors in a predetermined order along the rows and columns;
    detect touch areas by scanning through the second touch sensors in a predetermined order along the rows and columns; and
    cause first and second processors to scan the first and second grids synchronized such that when the first and second touch screens are arranged side by side so that at neighboring sides of the first and second grids there are neighboring rows of each touch screen adjacent to each other, the first and second touch sensors of neighboring rows are scanned substantially simultaneously.

18. An article of manufacture according to claim 17, wherein the controlling further comprises causing the apparatus to select by a first timing controller for touch detection one row at the time in the first grid of rows and columns.

19. An article of manufacture according to claim 18, wherein the controlling further comprises causing the apparatus to select by a second timing controller for touch detection one row at the time in the first grid of rows and columns.

20. An article of manufacture according to claim 18, wherein the controlling further comprises causing the apparatus to select by the first timing controller for touch detection one row at the time in the second grid of rows and columns.

* * * * *